(12) United States Patent
Øygard

(10) Patent No.: US 9,128,596 B2
(45) Date of Patent: Sep. 8, 2015

(54) METHOD AND DEVICE FOR SELECTING AND DISPLAYING A REGION OF INTEREST IN AN ELECTRONIC DOCUMENT

(75) Inventor: Karl Anders Øygard, Oslo (NO)

(73) Assignee: OPERA SOFTWARE ASA, Oslo (NO)

( * ) Notice: Subject to any disclaimer, the term of this patent is extended or adjusted under 35 U.S.C. 154(b) by 954 days.

(21) Appl. No.: 11/525,177

(22) Filed: Sep. 22, 2006

(65) Prior Publication Data

US 2008/0077880 A1    Mar. 27, 2008

(51) Int. Cl.
*G06F 3/0485* (2013.01)

(52) U.S. Cl.
CPC .................... *G06F 3/0485* (2013.01)

(58) Field of Classification Search
CPC ............... G06F 17/218; G06F 3/0485
USPC .......................... 715/246, 272, 243
See application file for complete search history.

(56) References Cited

U.S. PATENT DOCUMENTS

| | | | | |
|---|---|---|---|---|
| 6,300,947 | B1 * | 10/2001 | Kanevsky | 715/866 |
| 6,456,305 | B1 * | 9/2002 | Qureshi et al. | 715/800 |
| 6,466,203 | B2 * | 10/2002 | Van Ee | 345/173 |
| 6,570,583 | B1 * | 5/2003 | Kung et al. | 345/661 |
| 6,593,944 | B1 * | 7/2003 | Nicolas et al. | 715/744 |
| 6,690,394 | B1 * | 2/2004 | Harui | 715/762 |
| 6,763,388 | B1 * | 7/2004 | Tsimelzon | 709/228 |
| 6,956,590 | B1 | 10/2005 | Barton et al. | |
| 7,075,512 | B1 | 7/2006 | Fabre et al. | |
| 7,210,099 | B2 * | 4/2007 | Rohrabaugh et al. | 715/249 |
| 7,272,787 | B2 * | 9/2007 | Nakamura et al. | 715/234 |
| 7,339,573 | B2 * | 3/2008 | Andert et al. | 345/157 |
| 7,450,114 | B2 * | 11/2008 | Anwar | 345/179 |
| 7,461,353 | B2 * | 12/2008 | Rohrabaugh et al. | 715/815 |
| 7,487,447 | B1 * | 2/2009 | Jerger | 715/252 |
| 8,005,825 | B1 * | 8/2011 | Ghosh | 707/723 |
| 2002/0030699 | A1 * | 3/2002 | Van Ee | 345/810 |
| 2002/0044154 | A1 * | 4/2002 | Baar et al. | 345/660 |
| 2002/0091738 | A1 * | 7/2002 | Rohrabaugh et al. | 707/517 |

(Continued)

FOREIGN PATENT DOCUMENTS

| | | |
|---|---|---|
| CN | 1549998 A | 11/2004 |
| EP | 0651543 A2 | 5/1995 |

(Continued)

OTHER PUBLICATIONS

Chen et al., Detecting Web Page Structure for Adaptive Viewing on Small Form Factor Devices, ACM, WWW 2003, May 20-24, 2003, Budapest, Hungary, pp. 225-233.*

(Continued)

*Primary Examiner* — Frank D Mills
(74) *Attorney, Agent, or Firm* — Birch, Stewart, Kolasch & Birch, LLP

(57) ABSTRACT

A method is provided for selecting a region of interest in an electronic document and displaying the selected region in a manner that is adapted to the capabilities of a display. The method may comprise such steps as loading a document, selecting a position within said document, analyzing the layout of the document in order to identify a region of interest containing said position, and displaying said region of interest on said display in a manner that aligns the region of interest with a window of said display. Also described is a device configured to perform the method and a computer program product including instructions for performing the method on a computing device.

15 Claims, 6 Drawing Sheets

(56) References Cited

U.S. PATENT DOCUMENTS

| | | | |
|---|---|---|---|
| 2002/0158908 A1* | 10/2002 | Vaajala et al. | 345/767 |
| 2003/0011631 A1* | 1/2003 | Halahmi | 345/744 |
| 2003/0101203 A1* | 5/2003 | Chen et al. | 707/513 |
| 2003/0110236 A1* | 6/2003 | Yang et al. | 709/219 |
| 2003/0137522 A1* | 7/2003 | Kaasila et al. | 345/619 |
| 2003/0237053 A1* | 12/2003 | Chen et al. | 715/514 |
| 2004/0100509 A1* | 5/2004 | Sommerer et al. | 345/864 |
| 2004/0100510 A1* | 5/2004 | Milic-Frayling et al. | 345/864 |
| 2004/0103371 A1* | 5/2004 | Chen et al. | 715/513 |
| 2004/0107403 A1* | 6/2004 | Tetzchner | 715/513 |
| 2004/0133848 A1* | 7/2004 | Hunt et al. | 715/500 |
| 2004/0177148 A1* | 9/2004 | Tsimelzon, Jr. | 715/501.1 |
| 2004/0183817 A1* | 9/2004 | Kaasila | 345/660 |
| 2004/0205513 A1* | 10/2004 | Chen et al. | 715/501.1 |
| 2005/0046615 A1 | 3/2005 | Han | |
| 2005/0050462 A1* | 3/2005 | Whittle et al. | 715/517 |
| 2005/0097444 A1* | 5/2005 | Ivarsey et al. | 715/501.1 |
| 2005/0149878 A1* | 7/2005 | White et al. | 715/784 |
| 2005/0195221 A1* | 9/2005 | Berger et al. | 345/660 |
| 2005/0210399 A1* | 9/2005 | Filner et al. | 715/767 |
| 2005/0229111 A1* | 10/2005 | Makela | 715/802 |
| 2005/0246651 A1* | 11/2005 | Krzanowski | 715/770 |
| 2005/0283739 A1* | 12/2005 | Mohr et al. | 715/800 |
| 2006/0036955 A1* | 2/2006 | Baudisch et al. | 715/747 |
| 2006/0041589 A1* | 2/2006 | Helfman et al. | 707/104.1 |
| 2006/0064636 A1* | 3/2006 | Hua et al. | 715/526 |
| 2006/0064647 A1* | 3/2006 | Tapuska et al. | 715/800 |
| 2006/0069808 A1* | 3/2006 | Mitchell et al. | 709/246 |
| 2006/0107205 A1* | 5/2006 | Makela | 715/520 |
| 2006/0146016 A1* | 7/2006 | Chan et al. | 345/156 |
| 2006/0195784 A1* | 8/2006 | Koivisto et al. | 715/523 |
| 2006/0274086 A1* | 12/2006 | Forstall et al. | 345/629 |
| 2006/0277460 A1* | 12/2006 | Forstall et al. | 715/513 |
| 2006/0277481 A1* | 12/2006 | Forstall et al. | 715/764 |
| 2007/0038643 A1* | 2/2007 | Epstein | 707/10 |
| 2007/0050703 A1* | 3/2007 | Lebel | 715/513 |
| 2007/0124669 A1* | 5/2007 | Makela | 715/520 |
| 2007/0150829 A1* | 6/2007 | Eschbach et al. | 715/781 |
| 2007/0206221 A1* | 9/2007 | Wyler et al. | 358/1.15 |
| 2008/0016462 A1* | 1/2008 | Wyler et al. | 715/810 |
| 2008/0033996 A1* | 2/2008 | Kesari | 707/104.1 |
| 2008/0072139 A1* | 3/2008 | Salinas et al. | 715/238 |
| 2008/0094368 A1 | 4/2008 | Ording et al. | |
| 2008/0122796 A1* | 5/2008 | Jobs et al. | 345/173 |

FOREIGN PATENT DOCUMENTS

| | | | |
|---|---|---|---|
| EP | 1255186 A2 | 11/2002 | |
| JP | 2005-507102 A | 3/2005 | |
| WO | WO-02/095566 A2 | 11/2002 | |
| WO | WO 02/101567 A2 | 12/2002 | |
| WO | WO-03/021568 A1 | 3/2003 | |
| WO | WO 2004040467 A1 * | 5/2004 | |
| WO | WO 2005/029308 A2 | 3/2005 | |
| WO | WO 2005106684 A1 * | 11/2005 | G06F 13/00 |

OTHER PUBLICATIONS

W3C, CSS 2.1 Specification Working Draft, W3C, Jun. 13, 2005, pp. 115-154.*

Artail et al., Device-Aware Desktop Web Page Transformation for Rendering on Handhelds, Pers Ubiquit Comput (2005), vol. 9, Published Sep. 27, 2005, pp. 368-380.*

Baudisch et al., Collapse-to-Zoom: Viewing Web Pages on Small Screen Devices by Interactively Removing Irrelevant Content, ACM, UIST 2004, Oct. 24-27, 2004, Santa Fe, New Mexico, pp. 91-94.*

* cited by examiner

METHOD AND DEVICE FOR SELECTING AND DISPLAYING A REGION OF INTEREST IN AN ELECTRONIC DOCUMENT

TECHNICAL FIELD

The present invention relates to the display of electronic documents on the display of a device. In particular, the invention relates to a method for selecting a region of interest within such a document and displaying the selected region in a manner that is adapted to the capabilities of the display. The invention also relates to a device configured to operate in accordance with the method and a computer program product comprising instructions that will enable a device to perform the method when installed on such a device.

BACKGROUND ART

Electronic documents such as web pages are often designed to be displayed on regular desktop computers with standard size displays. When such documents are displayed on other devices, e.g. handheld devices, mobile phones, television sets or gaming consoles, the size and layout of the display may not render the document in a manner that is convenient to the user. Various methods have been suggested in order to handle this. Such methods usually make modifications to the document before it is displayed in order to make the document fit on the screen. This typically involves removing content or layout that does not suit the size or inherent properties of the screen. A common problem with such solutions is that the page may be rendered unusable or that the user does not recognize the document or has difficulties navigating within the document.

Other approaches involve resizing or moving parts of the document, such as reducing image sizes, reducing the number of columns by changing the layout of the document, and changing colors, contrasts, brightness and font sizes.

SUMMARY OF THE INVENTION

According to the present invention a method is provided for selecting a region of interest in an electronic document and displaying the selected region in a manner that is adapted to the capabilities of a display.

The method may comprise such steps as loading a document, selecting a position within said document, analyzing the layout of the document in order to identify a region of interest containing said position, and displaying said region of interest on said display in a manner that aligns the region of interest with a window of said display.

According to the invention the position may be selected based on an analysis of the document itself, or based on user input from an input device such as a mouse or a keyboard.

In accordance with various embodiments consistent with the principles of the invention, the position may, at least initially, be defined by at least first set of coordinates representing a point within the document. Additional coordinates may represent additional points within the document. Several points may, according to some embodiments of the invention, be used to represent an area of the document. Points or areas of the document may, according to some embodiments of the invention, be used to identify objects or elements that are part of the document, and these objects or elements may be used in order to determine or identify the region of interest.

According to some embodiments of the invention, the identification of a region of interest includes such steps as identifying a layout box in the document associated with the position, and selecting the region such that it contains substantially the entire layout box along at least one dimension. Consistent with the principles of the invention, the document may be a markup language document, and the layout box may be at least one DOM element or at least one CSS containing block.

Selecting the region such that it contains substantially the entire layout box along at least one dimension may, according to some embodiments of the invention, selecting a region with substantially the same width as said layout box.

According to embodiments consistent with the principles of the invention, the step of displaying the region of interest may comprise the determination of a first resolution with which a currently displayed region of said document is displayed, the calculation of a desired second resolution for displaying said region of interest, and performing a stepwise change from said first resolution to said second resolution. Such a stepwise change of resolution may then have the effect of zooming in or out on the region of interest.

According to embodiments consistent with the principles of the invention, the step of displaying said region of interest may also comprise the determination of a first position in said document representative of a currently displayed region of said document, the determination of a second position in said document representative of said region of interest, and the sequential display of a number of regions of said document along a path from said first position to said second position. Such a stepwise display of regions along a path may represent a panning and/or tilting (horizontal or vertical scrolling) from a current region to the region of interest.

Consistent with principles of the invention, in embodiments where both the zooming and the panning/tilting described above have been implemented, they may be performed simultaneously, or one may be performed before the other.

The invention also comprises a computing device with a display, a user input interface, a communications interface capable of receiving electronic documents and a memory into which a received document can be loaded, as well as hardware and software components that together comprise a module capable of performing the method of the invention.

Finally the invention also comprises a computer program product carried on a computer readable medium such as a CR-ROM, a DVD-ROM or a hard drive, and comprising instructions that, when loaded and executed on a computing device, is capable of performing the method of the invention.

BRIEF DESCRIPTION OF FIGURES IN THE DRAWINGS

Figure 3A:
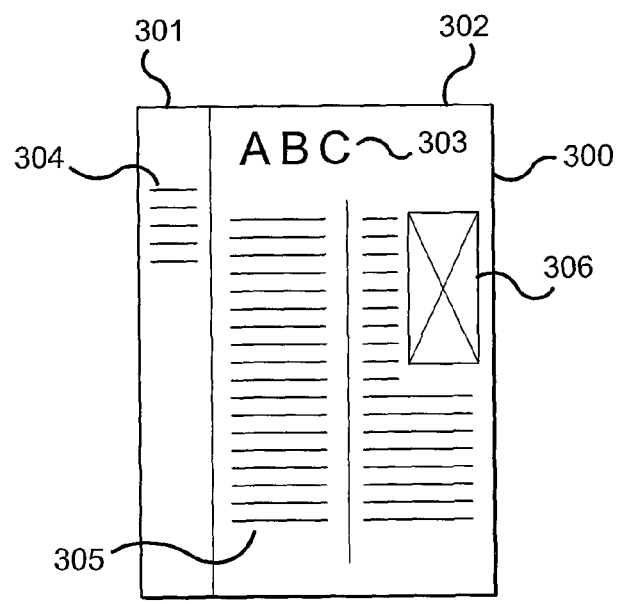
Figure 3B:
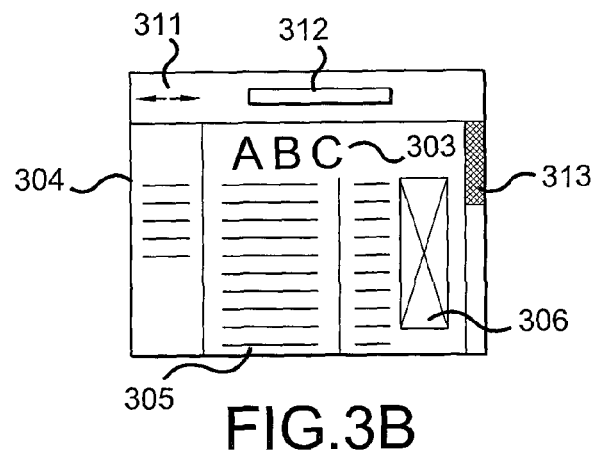
Figure 3C:
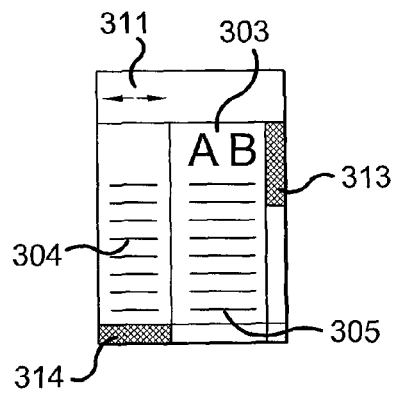
Figure 4:
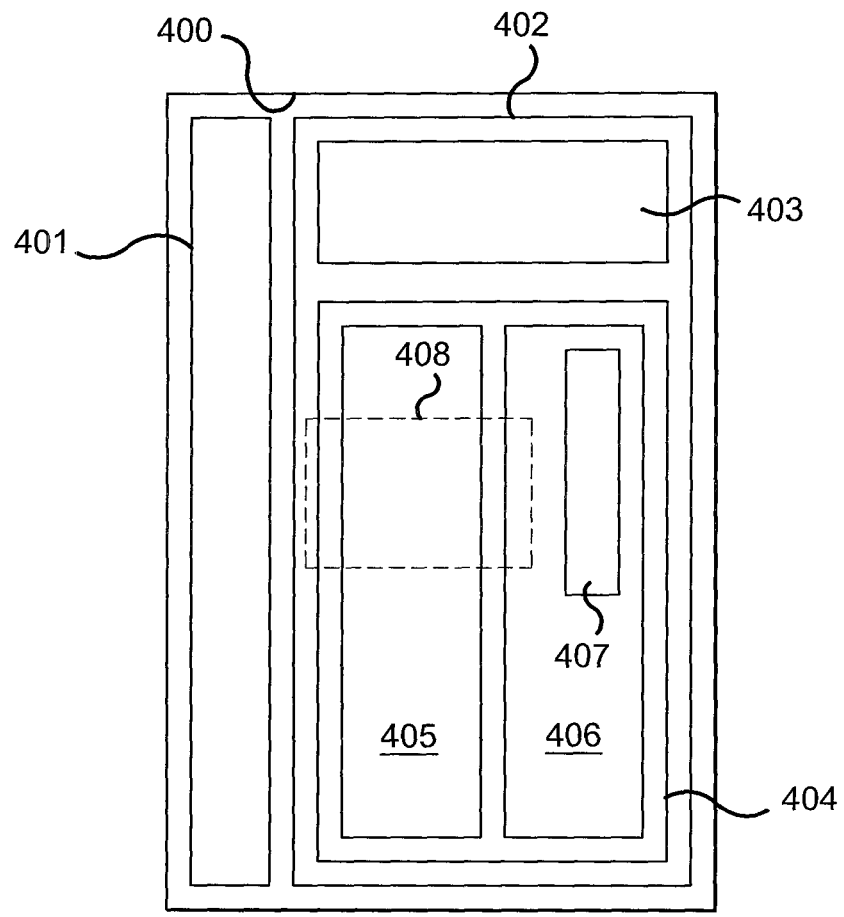
Figure 5A:
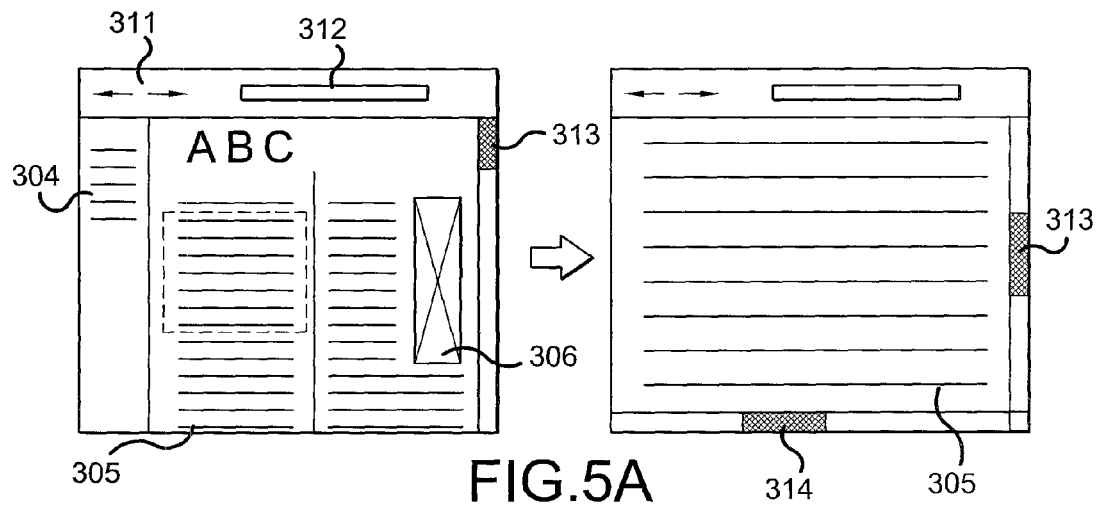
Figure 5B:
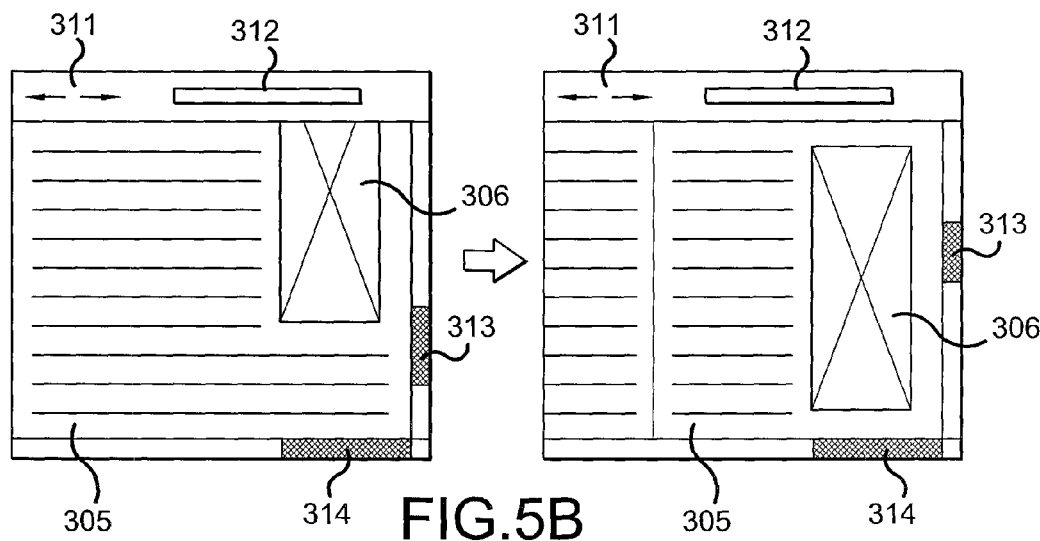
Figure 5C:
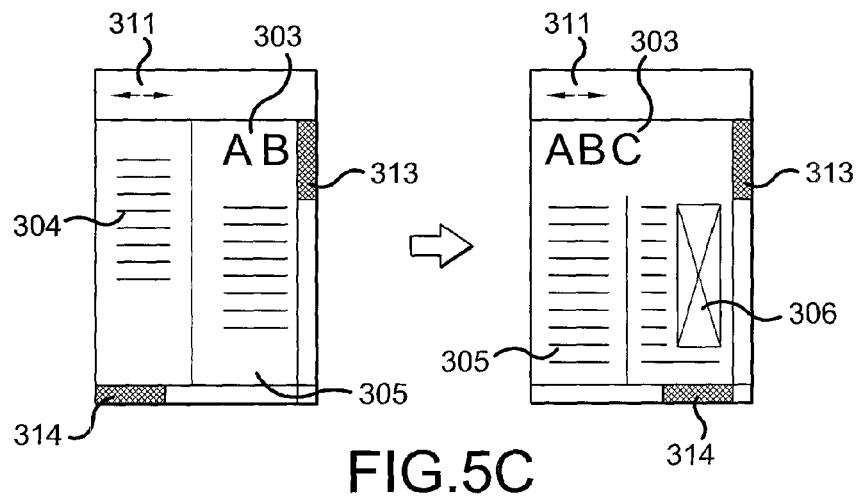
Figure 6:
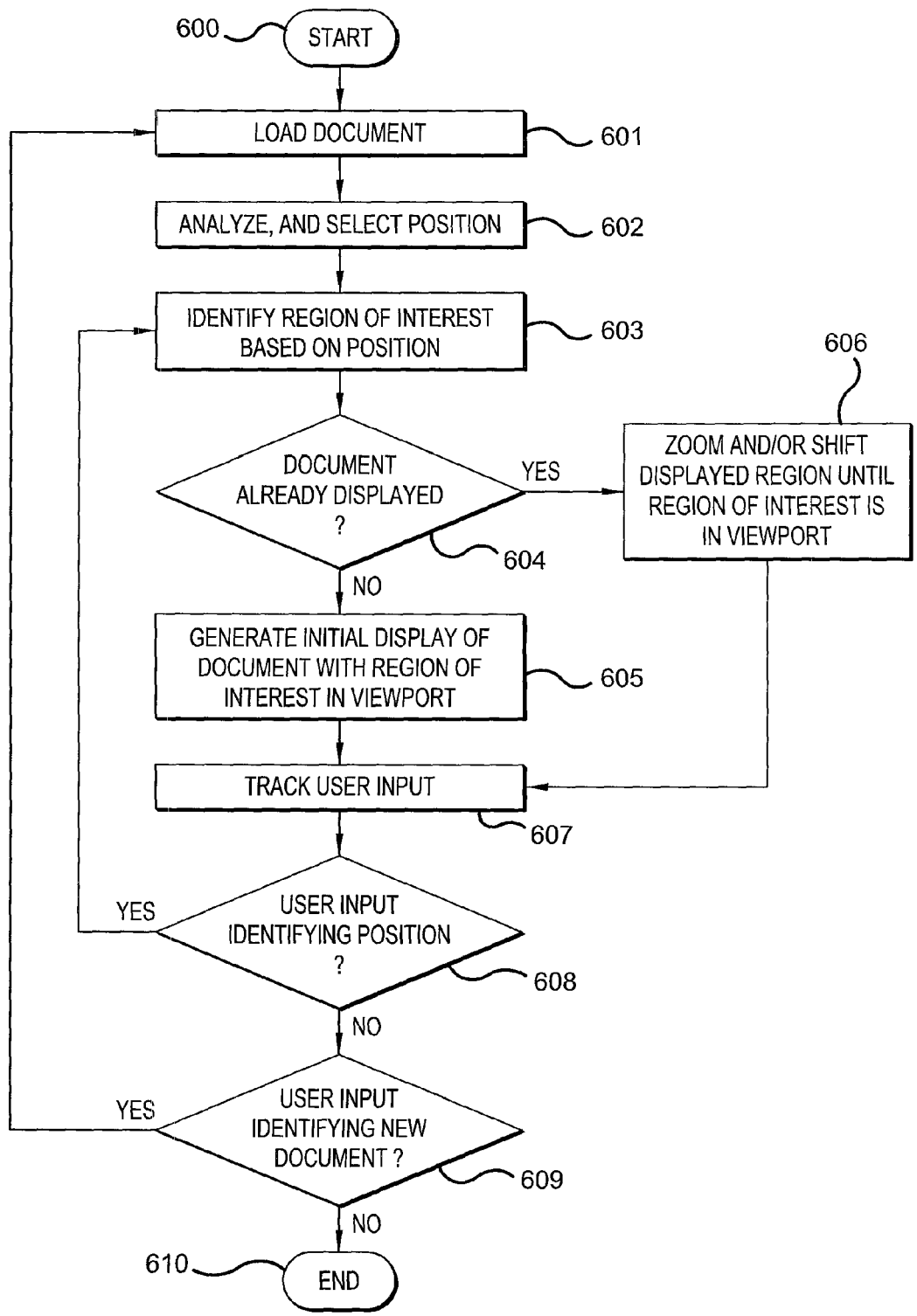

FIG. 3A-C shows the layout of an electronic document and its display in a browser window;

FIG. 4 shows how the layout of an electronic document may be a result of a number of layout boxes;

FIG. 5 shows how a region of interest may be identified and displayed based on the present invention; and FIG. 6 is a flowchart illustrating a method of the invention.

MODES FOR CARRYING OUT THE INVENTION

The present invention will now be described in further detail with reference to the accompanying Figures. The present invention may be embodied in many different forms and should not be construed as limited to the embodiments set forth herein. Rather these embodiments are provided as examples in order to provide those skilled in the art with a complete understanding of the invention.

In particular it should be understood that while the examples refer to particular standards and formats for creating, formatting, transmitting and displaying content on the Internet and the World Wide Web, the invention should not be construed as limited to the particular standards mentioned herein.

Figure 1:
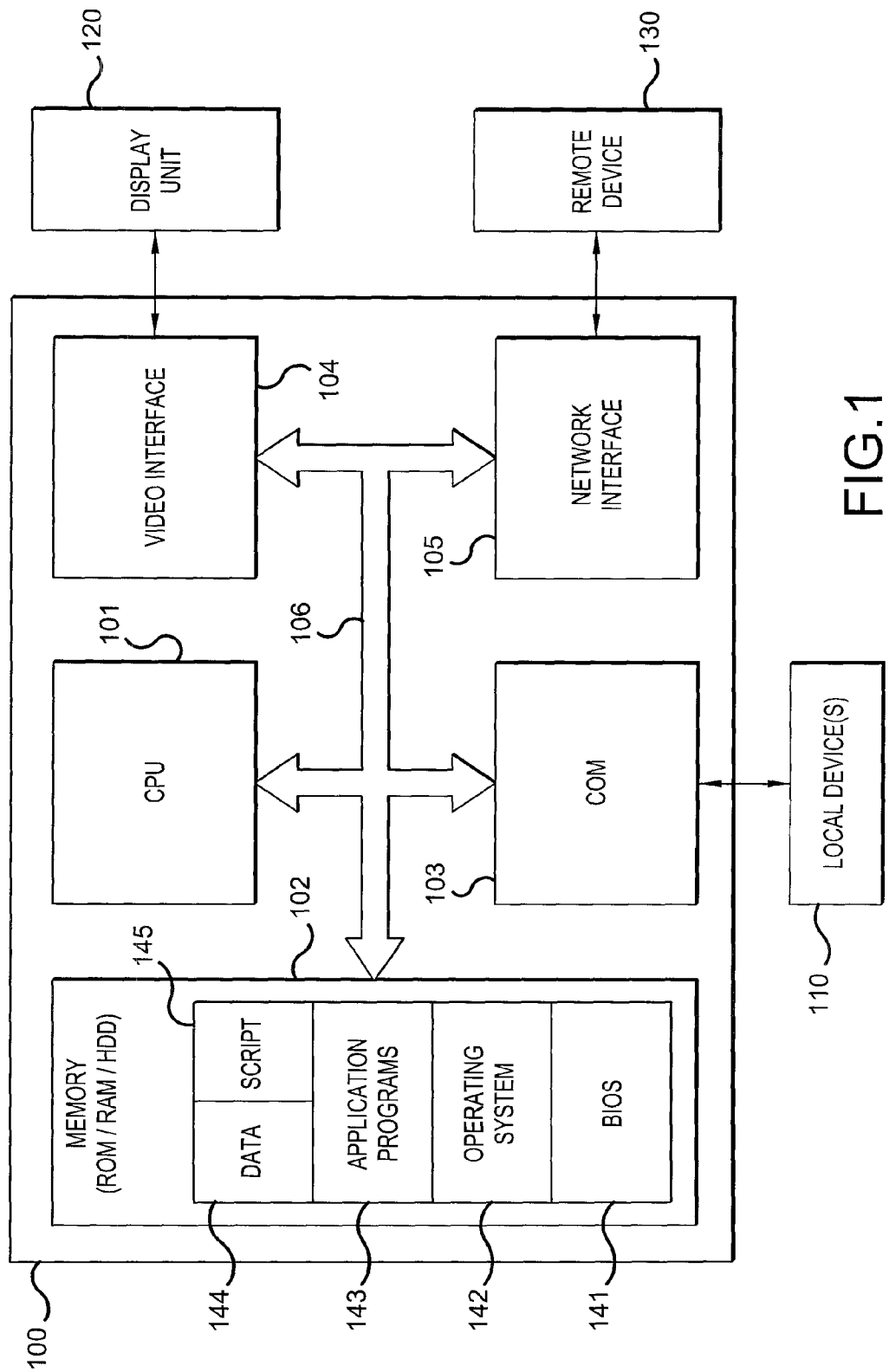
FIG. 1 shows a diagram of a computing device that can be used for implementing various aspects of the invention.

FIG. 1 illustrates a generalized computing device 100 that can be used as an environment for implementing various aspects of the present invention. In FIG. 1, a device 100 includes a central processor unit (CPU) 101, memory 102, communication port(s) or input/output ports (hereinafter referred to as I/O) 103, a video interface 104, and a network interface 105. These units are in communication with each other by way of a system bus 106.

The memory, which may include ROM, RAM, flash memory, hard drives, or any other combination of fixed and removable memory, stores the various software components of the system, such as a basic input/output system (BIOS) 141, an operating system 142, various computer programs 143 including applications and device drivers, various types of data 144, and other executable files or instructions such as macros and scripts 145.

The I/O ports 103 may be connected to one or more local devices 110 such as user input devices such as keyboard, mouse, or a remote control, a printer, media players, external memory devices, and special purpose devices such as e.g. a global positioning system receiver (GPS) or a television set top box. The I/O ports 103 may be any combination of such ports as USB, PS/2, RS-232, infra red (IR), Bluetooth, printer ports, or any other standardized or dedicated communication interface for local devices.

The video interface device 104 is connected to a display unit 120 which may be an external monitor or an integrated display such as a LCD display. The display unit 120 may have a touch sensitive screen and in that case the display unit doubles as a user input device. The user input device aspects of the display unit may be considered as one of the local devices 110 communicating over a communication port 103.

The network interface device 105 provides the device 100 with the ability to connect to a network in order to communicate with a remote device 130. The communication network, which in FIG. 1 is only illustrated as the line connecting the network interface 105 with the remote device 130, may e.g. be a local area network or the Internet. The remote device may in principle be any computing device with similar communications capabilities as the device 100, but may typically be a server or some other unit providing a networked service. It will be understood by those with skill in the art that the communication network may be any publicly accessible network, or combination of networks, including the Internet, cellular mobile networks such as GSM, the public telephone network, cable networks, or analog or digital broadcasting or satellite.

It will be understood that the device 100 illustrated in FIG. 1 is not limited to any particular configuration or embodiment regarding size or resources. The various components illustrated may be implemented as one or more integrated units of the device 100 or distributed over several units. Other units or capabilities may of course also be present. Furthermore, the device 100 may e.g. be a general purpose computer such as a PC, or a personal digital assistant (PDA), a cellphone or a smartphone, or a gaming console or television set top box or media center.

Figure 2:
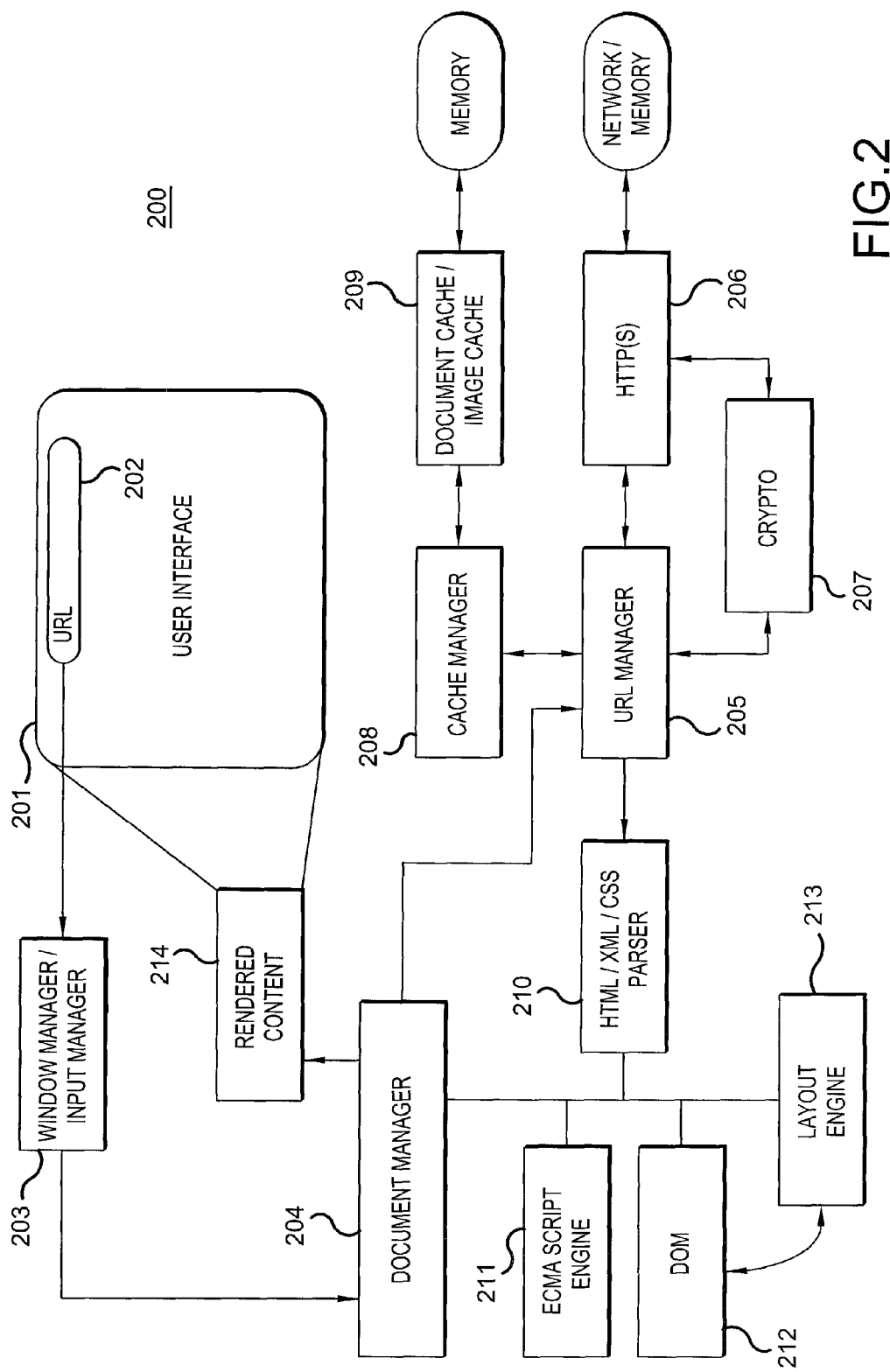
FIG. 2 shows the various modules of a user agent application that may used in conjunction with the invention.

Various aspects of the present invention are consistent with implementation as components and/or functionality that make up parts of a user agent or a browser that may be installed as an application on a device 100. FIG. 2 shows an example of a number of modules that may be present in such a user agent. The modules will typically be software modules, or some other implementation in software, that may be executed by the CPU 101.

The user agent 200 presents the user with a user interface 201 that may be displayed on the display unit 120 shown in FIG. 1. The user interface may include an address field 202 where the user may use an input device to enter the URI of a document or a service he or she wants the user agent 200 to retrieve. The address field 202 may also be a link that is displayed and that may be activated by the user using a pointing device such as a mouse, a scrolling device or some other means for selecting displayed items. Alternatively the URI may be specified in the code of a document or script already loaded by the user agent.

In any case, the URI may be received by a window and input manager 203 that represents the input part of a user interface associated with or part of the user agent 200. The URI may then be forwarded to a document manager 204 which manages the data received as part of the document identified by the URI.

The document manager 204 forwards the URI to a URI manager 205 which again instructs a communication module 206 to request access to the identified resource. The communication module 206 may be capable of accessing and retrieving data from a remote device 130 such as a server over a network using the hypertext transfer protocol (HTTP) or some other protocol such as HTTPS or FTP. The communication module may also be capable of accessing data that is stored in local memory 102.

If communication outside the device 100 is required to be encrypted, e.g. as specified by the protocol used to access the URI, encryption/decryption module 207 handles communication between the URL manager 205 and the communication module 206.

The data received by the communication unit 206 in response to a request is forwarded to the URI manager 205. The URI manager may then store a copy of the received content in local memory 102 using a cache manager 208 which administers document and image cache 209. If the same URI is requested at a later time the URI manager 205 may request it from the cache manager 208 which, unless the cached copy has been deleted, will retrieve the data from the cache 209 and forward it to the URI manager 205. In this case it will not be necessary to retrieve the data again from a remote device 130 when the same URI is requested a second time.

The URI manager 205 forwards the received data to a parser 210 that may be capable of parsing such content as HTML, XML and CSS. The content may then, depending on the type and nature of the content, be processed further by an ECMAScript engine 211, a module for handling a document object model (DOM) structure 212 and/or a layout engine 213.

This processing of the retrieved content is administered by the document manager 204, which may also forward additional URI requests to the URI manager 205 as a result of the processing of the received content. These additional URIs may e.g. specify images or other additional files that should be embedded in the document specified by the original URI.

When the data representing the content of the specified document has been processed it is forwarded from the document manager 204 in order to be rendered by a rendering engine 214 and displayed on the user interface 201.

The various modules thus described are executed by the processing unit 101 as the processor receives instructions and data over the system bus(es) 106. The communications module 206 communicates with the remote device 130 using the network interface 105. The functionality of the various modules may of course be integrated in fewer larger modules, or distributed or replicated over several modules.

It will further be understood that the user agent 200 just described may be implemented as an application program 143, but that some functionality may also be part of the operating system 142 or even the BIOS 141 of the device 100. The content received in response to a URI request may be data 144, script 145 or a combination of these as further described below.

Electronic documents, such as web pages, are typically created using a markup language such as HTML, XHTML or XML, and they are usually given a layout that is designed for standard computer displays. However, user agents such as browsers are more and more often installed on other types of devices, such as PDA's, cellphones, television set top boxes and gaming consoles. Such devices have a wide variety of displays with different sizes, shapes and resolution. These devices may not be able to render and display web pages in a meaningful way. A document may be reduced in size to the point of becoming unreadable, only a small part of the document may be displayed at a time, or the layout of the document may be changed in ways that were never intended by the creator of the document.

Reference is now made to FIG. 3, which shows in FIG. 3A the entire lay out of an exemplary web page 300. The web page includes a left margin 301 and a main content area 302. The main content area 302 includes an article starting with a headline 303, while the left margin 301 includes a navigation menu 304 with a number of menu entries that may be hyperlinks to other parts of the same web site. In the main content area 302 two columns of text follows below the headline 303, and within the right column an image 306 has been inserted.

FIG. 3B shows a part of the web page of FIG. 3A displayed in a browser window or user agent window. The user agent may be similar to that which is described above with reference to FIG. 2, and the window may be displayed on the display of a device similar to that described above with reference to FIG. 1.

The window includes navigation buttons 311, an address field 312 where the URL of a desired document may be entered, and a vertical scroll bar 313. The remaining part of the browser window is used to display a part of the document 300. This remaining part of the window is referred to as the viewport. It will be noticed that in the example illustrated in FIG. 3B, the viewport is wide enough to display the entire width of the web page 300, while only the upper part of the document can be shown. In order to view the rest of the document, the vertical scroll bar 313 has been provided. This scrollbar makes it possible to move the viewport down relative to the document 300.

FIG. 3C again shows a part of the web page 300, but this time displayed on a small display that may be the display of a PDA or a cellphone. The user agent window may include some of the features of the browser window illustrated in FIG. 3B, such as navigation buttons 311 and a vertical scroll bar 313. In addition a horizontal scroll bar 314 has been provided. Because of the small size of the viewport, only a part of the document can be displayed. In order to view the entire document, a user will have to scroll both horizontally and vertically.

In the case illustrated in FIG. 3B, it may be possible to read the entire document without too much trouble. However, there may be reasons why a user may, for instance, want to zoom in on particular elements of the document, i.e. enlarge the document such that only a small section is displayed in the viewport. One example of such a reason could be that the display 120 on which the user agent window is displayed has a low resolution, possibly in combination with the user being positioned a distance away from the display 120 such as may be the case if the display 120 is the screen of a television, it may be difficult to see the displayed content properly. Another reason may be that the user has reduced eyesight and desires to enlarge the various parts of the document.

In the case illustrated in FIG. 3C, it will be realized that navigating through the document may be difficult, and that reading the text 305 will be particularly difficult if the lines of text are wider than the viewport. A user may then desire to zoom in and out of the document, while bringing the desired content entirely inside the viewport, at least in one dimension.

Reference is now made to FIG. 4, which illustrates how the document 300 may be organized in terms of lay out. It will be realized by those with skill in the art that this is only one of several examples, and that the same lay out may be achieved in several ways, dependent, for example, on the structure of the structure of the markup language code of the document 300.

The example illustrated in FIG. 4 is based on Cascading Styles Sheets (CSS), level 2 revision 1, as specified in Technical Report No. TR/2006/WD-CSS21-20060411, "Cascading Style Sheets, level 2 revision 1 CSS 2.1 Specification," published by the World Wide Web Consortium (W3C) on Apr. 11, 2006, edited by Bert Bos, Tantek Celik, Ian Hickson, and Håkon Wium Lie, and which is hereby incorporated by reference. The invention is, however, not limited to this version of CSS, or indeed CSS in particular. The example given below is somewhat simplified and may not include all possibilities and features or exceptions.

When a markup language document is received by a user agent such as the one illustrated in FIG. 2, the document is typically handled as described above. The layout engine 213 may, based on the DOM structure of the document, generate a number of boxes based on elements in the DOM tree. According to the general approach of the CSS 2.1 box model, boxes defined as block boxes establish containing blocks for descendant boxes. (Certain other types of blocks, such as inline boxes are not block boxes.) In addition, certain other types of elements that are not defined as boxes, such as various table elements, also establish containing blocks.

The dimensions and position of a given box may be calculated with respect to the edges of its containing block. In FIG. 4 the top level box 400 is the containing block for the entire page. The left margin 301 is contained in one descendant box 401, while the main content 302 is contained in another descendant box 402. The position of the menu 304 may then be calculated based on the edges of its containing block 401. The headline 303 may be contained in a box 403 which has box 402 as its containing block. Box 402 may contain an additional box 404 which contains the main text 305 of the document 300. The position of the headline 303 may be calculated based on the edges of its containing block, box 403. Since the text 305 is distributed over two columns, the box 404 may contain two descendant boxes 405 and 406. Both of these boxes have box 404 as their containing block. Finally, box 406 contains an additional box 407, which has box 406 as its containing block, and which in turn serves as containing block for the image 306.

Additional boxes that are not shown in FIG. 4 may also be present. Typically, each line of text contained in boxes 405 and 406 has its own line box, and if the text contains hyperlinks, these links may be contained in inline boxes. A more detailed discussion of various types of boxes can be found in the above referenced CSS specification.

In typical implementations of user agents the input manager 203 is capable of tracking the position of a pointing device such as a mouse pointer. This position can be compared with the layout created by the layout engine 213, as illustrated in FIG. 4. As long as the position of the pointing device is inside the viewport of the user agent window, it will by necessity be inside the topmost box 400, which is the containing block of the entire document. The pointer, or cursor, may also be inside additional boxes, and it is considered to hover over the element that has generated the innermost box the pointer is inside. As an example, if the pointer is inside box 405 it will by necessity also be inside box 404, box 402 and box 400. However, the left column of the two text columns 305 will be the element over which the pointer is hovering (unless it is inside additional boxes such as line boxes or inline boxes). Similarly, if the pointer is inside box 407 it is not the right hand column of text 305, but rather the image 306 it is hovering over.

Additional input from the user, such as a mouse click, may then be interpreted by the user agent as a click on, or selection of, the element the pointer is hovering over, and the user agent may perform certain appropriate actions based on such a selection. However, the user agent may also be configured to perform certain actions simply because the pointer hovers over an element.

Without a pointer type input device, selection of elements may be more complicated, but a number of alternatives can be implemented, such as keyboard or joystick input that moves from element to element.

According to the present invention, the selection of a position within an electronic document 300 may initiate a selection of a region of interest containing the selected position and the subsequent display of the selected region.

The selection of a region of interest may be based on user input, as will be further described below, but it may also be based on an analysis of the document performed by the user agent 200. This may particularly be useful when a document is first loaded, dependent on the nature of the display. According to some embodiments of the invention, an analysis of the document 300 is therefore performed when the document is loaded, or when such an analysis is invoked by user input, and a position inside the document is selected based on this analysis. The analysis may, as an example, select the upper left corner of the first box generated by a particular type of element, such as a headline, or a table. The invention is not limited to any particular criteria for selection of a position based on analysis, which may be left to a designer or even be user configurable.

According to embodiments that are consistent with principles of the present invention, the selected position may be based on user input. This user input may include coordinates representing the position of a pointing device such as a mouse cursor. The received coordinates may be used to select one or more elements on a web page and select a region of interest that contains the selected elements.

Alternatively, the user input may represent an element in the document directly. This may typically be the case when e.g. a markup language document is loaded by a user agent running on a device without a pointing device, such as a mobile phone or a PDA with keyboard or keypad input.

It should be understood that the exact nature of the user input device and the data received from the input device is not an essential part of the invention, as long as it can be translated to or associated with a position in the layout of the document 300. The position may for example be a point, a region or an element somewhere in the page.

When user input that is representative of a position within the layout of the page 300 is received and identified as a user attempt at selecting a region of interest, the received position may be used to select a region of interest. User input may in many embodiments consistent with the invention be received for other purposes than selecting a region of interest, such as clicking on a hyperlink or bringing focus to a particular element such as an input field. Various methods may be used in order to identify the user input as an attempt to select a region of interest. According to some embodiments, user input representing a position of a pointing device and a mouse click may be identified as such input, provided that the position of the pointing device is not associated with an active element such as e.g. a hyperlink, a button, an input field, or a drop down menu. Alternative embodiments include a pointing device position and a click from a second mouse button or a click combined with the pressing of a keyboard key (e.g. shift+click), clicking and dragging the pointing device, pressing a tabulator key repeatedly until a proper element is chosen followed by the pressing of a designated keyboard key, or any other user input specified by a designer and capable of identifying a position such as a point, an element or a region.

When a position has been identified based on user input or an analysis of the document, a region of interest may be selected based on this position. According to embodiments consistent with the principles of the invention, the position is used in order to select at least one layout box. If the document is a markup language document handled according to CSS, a layout box may be any element establishing a containing block, such as a block box or a table element. However, it should be understood that the term layout box, as used in the present specification and claims, is not intended to be interpreted as limited to any definition given in a particular standard or specification. Rather, a layout box may be any element in an electronic document that serves to define the physical position of certain content on the page.

The layout box that is selected may be the innermost layout box associated with the selected position. As already described with reference to FIG. 4, a mouse click inside box 405 may select box 405, not box 400 or 404. However, certain rules may be established in order to make boxes ineligible for selection, e.g. because they are too small. As an example, if box 407, and hence the image 306, is considered too small for selection, a position (e.g. identified by a mouse click) inside box 407 may still result in the selection of box 406.

After a layout box has been selected, its size or proportions may be compared with the size of the display or the viewport where the document 300 is displayed. The region of interest may then be selected as a region that includes the selected position, includes substantially the entire layout box along at least one dimension, and has substantially the same proportions as the viewport or display. As an example, a click inside box 405 in FIG. 4, corresponding with a click in column 305 in FIG. 3B, could result in the selection of region 408, indicated by dashed lines in FIG. 4.

By the term substantially it should be understood that it is within the scope of the present invention to include extra space outside the layout box, or to trim the layout box some. As long as the region is selected based on the size or shape of the layout box, it does not matter whether e.g. a region of e.g. 5 or 10 pixels, or any other reasonable number for that matter, even only one or two, is included from outside the layout box or trimmed from inside the layout box.

It will be realized that any given layout box does not have to have the same aspect ratio, or even the same shape, as the viewport of the display or the displaying application (e.g. a user agent or browser window). Whether to choose the horizontal or vertical dimension as the dimension along which to include the entire layout box is a matter of design choice. According to some embodiments it will be most convenient to select the horizontal dimension, e.g. in order to include entire lines of text within the region of interest. According to other embodiments of the invention it will be preferred to retain the vertical dimension, e.g. when displaying images in portrait format.

According to certain aspects of the invention the selection of which dimension to retain can be done dynamically based on the type of content. Certain rules may e.g. require that if the content of the layout box is text, the horizontal dimension should be selected, while if the content is an image, the vertical dimension should be selected. Such a rule may also take into account the shape or aspect ratio of the layout box, choosing a region of interest that results in a particular dimension filling the entire region of interest, while the other dimension either reaches outside the selected region of interest or does not reach the edges of the region of interest.

After a region of interest with the same shape as the viewport has been selected, the region of interest is rendered displayed such that it fills substantially the entire viewport. If the region of interest has been selected based on an analysis of the document upon first loading by the user agent, this may be the initial display of the document. However, if a different region of the document is currently being displayed, the resolution of the display may be changed (i.e. the document may be enlarged or reduced in displayed size) and the region may be shifted to the newly selected region of interest. According to some embodiments consistent with the principles of the invention, this change of resolution (zooming) and/or the shifting (panning, tilting) may be done stepwise in order to achieve a gliding or sweeping effect which will help the user to stay oriented regarding which part of the page is currently being shown.

It should be understood that the exact dimensions of the selected region of interest do not have to be explicitly represented in the device 100. It may be represented as one representative coordinate or position (e.g. a corner) and a size, by an edge (e.g. an edge along the dimension, or direction, that will be retained intact) and a necessary change in resolution, or in any other way as long as it is possible to derive the necessary shift and change in resolution. In other words, the invention is not limited to the selection of a region with a particular aspect ratio, as long as an area is implicitly defined by a position, a desired size or resolution and a positioning in a viewport when the region is displayed. It is even within the scope of the invention to change the shape (e.g. the aspect ratio) of the viewport based on the selected region of interest.

The stepwise zooming may be performed by calculating the difference in size between the region currently viewed in the viewport and the current size of the selected region of interest. The resolution may then be changed stepwise towards a desired resolution that will give the selected region of interest substantially the same size as the viewport (measured in pixels). Similarly, the shifting may be achieved by calculating a path from a position within the currently displayed region to a corresponding position within the selected region of interest, e.g. a particular corner or the center of the two regions. A number of intermediary regions along this path may then be calculated and displayed sequentially. It will be understood that either or both of these methods may be used in any particular embodiment of the invention, and that they may be performed simultaneously or one before the other.

FIG. 5A illustrates an example where the top of document 300 is displayed, and where user input indicates a position within the left part of column 305 (contained in containing block 405). A region of interest with the same width as the column 305 and with the same proportion (aspect ratio) as the viewport is selected. After the region has been shifted and the resolution has been changed, the column fills the entire width of the viewport and the user may scroll up and down in the text by using the vertical scroll bar 313.

FIG. 5B illustrates an example where a region of interest has already been selected, in this case the right part of column 305 (contained in containing block 406). A part of the image 306 (in containing block 407) is also shown. In this example a position within containing block 407 is identified, causing block 407 and the image 306 to be chosen as the region of interest. According to this example the image is considered large enough to be selected (or no rule regarding minimum size of a region has been implemented). Furthermore, since the content of the identified block is an image, the vertical dimension is selected to be the dimension to be entirely contained within the selected region (e.g. by a simple rule selecting the vertical dimension for images, because it is the largest dimension of the image, because that is the dimension which will bring the entire image inside the viewport, or by any other rule chosen by design).

In this case the width of the selected region is chosen based on the height of the image and the aspect ratio of the viewport. Since the selected region of interest is larger than the currently displayed region, the resolution will change opposite the example in FIG. 5A, causing a zoom out effect.

FIG. 5C illustrates an example where document 300 has been loaded on a device with a small vertical screen. The initial display corresponds with that illustrated in FIG. 3C. Based on analysis of the document, or as a result of user input, the containing block 403 holding the headline 303 has been selected, and a region of interest holding the entire width of block 403 has been selected. Since the region has substantially the same aspect ratio as the viewport, this also includes most of the two columns 305 and the image 306.

Reference is now made to FIG. 6, which illustrates in a flow chart an exemplary method in accordance with the invention. It will be understood from the above description and the claims that not all of the steps illustrated are necessary in all embodiments of the invention.

Following an initial startup step 600, a document is loaded 601. According to this example the document is analyzed 602 in order to identify a selected position. As an example, such a position may be a corner or center of a block containing a first headline. However, the document may also be displayed from the top left corner in its native resolution, or the resolution may be changed to fit the entire document within the viewport, at least in one dimension (i.e. selecting a position associated with the topmost layout box, containing block 400 in the example of FIG. 4). Based on the selected position, which as described above may be anything that can be associated with a layout box, a region of interest with substantially the same proportions as the viewport may be identified 603.

If the document has just been loaded and is not already displayed, determined in a determination step 604, an initial display of the region of interest may be generated in the viewport according to step 605. However, if some region of the document is already displayed a step 606 of zooming in or out and/or shifting may be performed in order to bring the identified region of interest into the viewport. As soon as the display has been generated, user input may be tracked 607, e.g. in terms of following the movements of a tracking device over or through layout boxes or other elements. If, in a determining step 608, it is determined that user input identifies a position that should be interpreted as a position intended to point out a region of interest, the method jumps back to step 603 and a region of interest is identified according to rules implemented for such selection, as discussed in detail above.

If user input is not identified as intended to identify a region of interest, it may be determined 609 to identify a new document to be loaded. For example the user may have activated a link identifying a document, as discussed in greater detail with reference to FIG. 2. If so, a new document is loaded 601 and the process is repeated. In principle the tracking of user input may continue in parallel with all other tasks and may cause the interruption of some or all of the steps, depending on choices made during the design of user agent 200, or even the device 100. Also, other user input not illustrated in FIG. 6 may be possible and may initiate other processes. When it is determined that received user input does not identify further user interaction, but dictates that the process should be terminated, it terminates in a final step 610.

It is consistent with certain embodiments of the invention to receive user input that identifies a position, e.g. a region or a curve, that includes more than one layout box that are not descendants of each other and to choose a region of interest that includes the combination of the several layout boxes included in the region of interest.

It is also consistent with certain embodiments of the invention to impose additional rules regarding e.g. text wrapping, font size, contrast, colors, in such a manner that the content within the selected region of interest is dynamically changed or reformatted when the region of interest is aligned with and displayed in the viewport.

Finally, it will be understood by those with skill in the art that the invention may be implemented on a number of hardware-software combinations and that it is not dependent on any particular hardware or software platform, operating system, programming language, communications protocol, markup language, and layout definition and rendering specification.

The invention claimed is:

1. A method for selecting and displaying a region of interest in an electronic document on the display of a device, comprising:
   loading said document onto said device;
   generating a tree structure of nested layout boxes based on corresponding markup language elements in said document;
   calculating dimensions and positions of the respective layout boxes;
   displaying at least a part of the document on said display;
   receiving user input which in combination with the position of a pointing device identifies a point within the document;
   selecting from among the nested layout boxes the innermost selectable layout box containing the identified point;
   comparing at least one of the size and the proportions of the selected layout box with the size of the display or the viewport;
   selecting the region of interest based on the comparing as a region within the document which includes the identified point and the entire selected layout box along at least one dimension, and which has the same proportions as the display or the viewport; and
   aligning said selected region of interest with the display or the viewport and displaying said region of interest, wherein aligning and displaying said region of interest comprises at least one of changing the resolution or shifting the displayed document to cause the region of interest to fill the display or the viewport along the at least one dimension.

2. The method according to claim 1, wherein said identified point includes at least first coordinates.

3. The method according to claim 1, wherein said document is a markup language document, and said selected layout box includes at least one DOM element.

4. The method according to claim 1, wherein said document is a markup language document, and said selected layout box is at least one CSS containing block.

5. The method according to claim 1, wherein said one dimension is the width of the selected layout box, and said region is selected to have the same width as said selected layout box.

6. The method according to claim 1, wherein aligning and displaying said region of interest comprises:
   determining a first resolution with which a currently displayed region of said document is displayed;
   calculating a desired second resolution for displaying said region of interest; and
   performing a stepwise change from said first resolution to said second resolution.

7. The method according to claim 1, wherein aligning and displaying said region of interest comprises:
   determining a first position in said document representative of a currently displayed region of said document;
   determining a second position in said document representative of said region of interest; and
   sequentially displaying a number of regions of said document along a path from said first position to said second position.

8. A computing device configured to display electronic documents for selecting and displaying a region of interest in an electronic document on the display of a device, comprising:
   a display;
   a user input interface;
   a communications interface capable of receiving electronic documents;
   memory into which a received document can be loaded;
   a module configured to:
      load said document on said device;
      generate a tree structure of nested layout boxes based on corresponding markup language elements in said document;
      calculate dimensions and positions of the respective layout boxes;
      display at least a part of the document on said display;
      receive user input which in combination with the position of a pointing device identifies a point within the document;
      select from among the nested layout boxes the innermost selectable layout box containing the identified point;
      compare at least one of the size and the proportions of the selected layout box with the size of the display or the viewport;
      select the region of interest based on the comparing as a region within the document which includes the identified point and the entire selected layout box along at least one dimension, and which has the same proportions as the display or the viewport; and align said identified region of interest with a window of said display and display said region of interest, wherein aligning and displaying said region of interest comprises at least one of changing the resolution or shifting the displayed document to cause the region of interest to fill the display or the viewport along the at least one dimension.

9. The device according to claim 8, wherein said identified point includes at least first coordinates.

10. The device according to claim 8, wherein said document is a markup language document, and said selected layout box includes at least one DOM element.

11. The device according to claim 8, wherein said document is a markup language document, and said selected layout box is at least one CSS containing block.

12. The device according to claim 8, wherein said one dimension is the width of the selected layout box, and said region is selected to have the same width as said selected layout box.

13. The device according to claim 8, wherein said module is further configured to align and display said region of interest by:

determining a first resolution with which a currently displayed region of said document is displayed;

calculating a desired second resolution for displaying said region of interest; and performing a stepwise change from said first resolution to said second resolution.

14. The device according to claim 8, wherein said module is further configured to align and display said region of interest by:

determining a first position in said document representative of a currently displayed region of said document;

determining a second position in said document representative of said region of interest; and sequentially displaying a number of regions of said document along a path from said first position to said second position.

15. A computer program product comprising a non-transitory computer readable medium storing instructions that, when loaded and executed on a computing device, are capable of performing the method of one of the claims 1, 2, and 3 to 7.

* * * * *